United States Patent
Simon

(10) Patent No.: US 6,739,574 B1
(45) Date of Patent: May 25, 2004

(54) VALVE PIEZO ELECTRIC

(76) Inventor: Powell Simon, 51 Old North Road, Royston, Hertfordshire SG8 5EP (GB)

( * ) Notice: Subject to any disclaimer, the term of this patent is extended or adjusted under 35 U.S.C. 154(b) by 35 days.

(21) Appl. No.: 10/130,495
(22) PCT Filed: Nov. 22, 2000
(86) PCT No.: PCT/GB00/04448
§ 371 (c)(1), (2), (4) Date: Aug. 13, 2002
(87) PCT Pub. No.: WO01/38766
PCT Pub. Date: Mar. 31, 2001

(30) Foreign Application Priority Data

Nov. 22, 1999 (GB) ................................ 9927574

(51) Int. Cl.[7] ............................................. F16K 31/00
(52) U.S. Cl. .................................................. 251/129.06
(58) Field of Search .............................. 251/129.06, 11

(56) References Cited

U.S. PATENT DOCUMENTS

| | | | |
|---|---|---|---|
| 2,016,484 A | * 10/1935 | Howard | ....................... 137/248 |
| 4,825,894 A | * 5/1989 | Cummins | ..................... 137/82 |
| 5,328,149 A | 7/1994 | Reuter | ................... 251/129.06 |
| 5,782,816 A | * 7/1998 | Werschmidt et al. | ........ 604/256 |
| 6,047,945 A | * 4/2000 | Grove et al. | ................... 251/68 |

OTHER PUBLICATIONS

Patent Abstracts of Japan, vol. 1996, No. 10, Publication No. 08159303; Jun. 21, 1996 Valve Flow Adjusting Device.

* cited by examiner

Primary Examiner—Gene Mancene
Assistant Examiner—Patrick Buechner
(74) Attorney, Agent, or Firm—Renner, Kenner, Greive, Bobak, Taylor & Weber

(57) ABSTRACT

A fluid valve comprising a valve member (6) arranged to be movable in a first direction to control fluid flow through an orifice (5) and electrically actuable means (1a, 1b) for controlling movement of said valve member, characterised in that the electrically actuable means comprises at least one bender element (1a) disposed in said first direction but bendable in a direction transverse to said first direction, and the valve member is provided with a profiled surface (8) engaging one end (3a) of the bender whereby the position of the valve member is controlled.

7 Claims, 2 Drawing Sheets

VALVE PIEZO ELECTRIC

The use of active materials such as piezo ceramics and electrostrictives is known in the field of fluid valves. The primary mode of operation for such devices is a cantilever construction that bends to cover and uncover a port. This approach is simple, but has the primary disadvantage of exerting relatively low sealing forces.

High sealing forces can be achieved through the use of soft seals and expensive ceramic or bender technologies. There is a requirement for a form of valve that is capable of producing high sealing forces from a low cost actuator.

The present invention provides a fluid valve comprising a valve member arranged to be movable in a first direction to control fluid flow through an orifice and electrically actuable means for controlling movement of said valve member, characterised in that the electrically actuable means comprises at least one bender element disposed in said first direction but bendable in a direction transverse to said first direction, and the valve member is provided with a profiled surface engaging one end of the bender whereby the position of the valve member is controlled.

In order that the present invention be more readily understood embodiments thereof will now be described by way of example with reference to the accompanying drawings in which.

Figure 1:
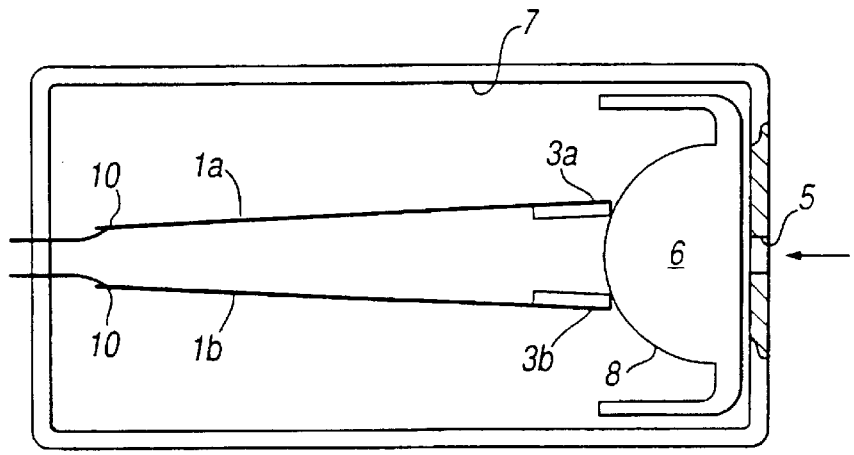
FIG. 1 shows a valve according t the present invention in an "off" condition.

According to the preferred embodiment of the present invention, a normally shaped valve orifice is provided having a soft elastomeric seal of a type that is typically used in pneumatic valve applications. Generally, for mains pressure pilot valves the orifice is a smooth hole 5 of 0.7 or 1.0 mm diameter, and the seal is a nitrile rubber. The seal is formed by or provided on a sealing member 6 and this member 6 is suitable shaped to move smoothly within a suitable channel or bore 7 such that it can slide within the bore but not rotate or rock. The rear portion of the member has a camming surface 8 in the form of a segment of a cylinder.

For a system wherein the actuator is capable of movement of approximately 2 mm the radius of the cylinder is preferably 7.5 mm and the centre of the cylinder is 5 mm below the back surface. The channel or bore 7 also supports one and preferably two piezo ceramic or electrostrictive bender devices 1. These can be of any convenient construction but are preferably and advantageously planar bimorphs as specified in EP-A-0265147.

For increased stiffness these planar bimorphs are preferably but not exclusively of the three-prong type and may be a multiplicity of such benders to increase the system force. The benders are mounted at their mounting points 10 such that they have an end deflection of 2 mm when excited. It will be seen by simple geometry that an offset of 2 mm from the centre line of a 7.5 mm radius circle creates an angle to the centre line of that circle of approximately 15°.

These dimensions can be adjusted to achieve the same effect with any suitable combinations of displacements and offsets. Two actuators are positioned symmetrically either side of the centre line to form an included angle of 30°. It is a feature of bender type actuators that as they deform and change position in the Y-plane the X-plane must necessarily shorten, as the material is effectively curling.

If the bender actuators were placed parallel to the centre line of the cylinder on the carrier when excited the X dimension would seduce. To counteract this effect the actuators are rotated with respect to the centre line of the cylindrical cam so that their maximum X dimension in the system is achieved when they have been excited. For a 2 mm deflection this rotation on a three-prong bimorph is approximately 5°.

From the illustration it will be seen that the assemblies thus far described comprises a V of two actuators which are cupping the cylindrical feature of the rear of the carrier.

Consider now the operation of the system:

As a voltage is applied to the actuators 1a, 1b they will deform bringing their tips 3a, 3b towards the centre line of the assembly. The force exerted by the devices towards the centre is translated by simple geometry to a force approximately four times that exerted in the direction of motion but with one quarter of the movement. Because the angular relationship of the tip to the cam changes as the part progresses forwards in the manner of atypical over-centre mechanism the further towards the centre that the actuators move the less the movement of the seal towards the orifice but the greater the sealing forces. With the dimension thus far described of a 2 mm stroke on a 7.5 mm radius cam the total axial motion of the seal with be approximately 0.35 mm. To obtain clean air-flow from a 1 mm orifice a clearance of 0.25 mm is required. The additional 0.1 mm provides compression of the seal and the necessary clamping force.

Figure 2:
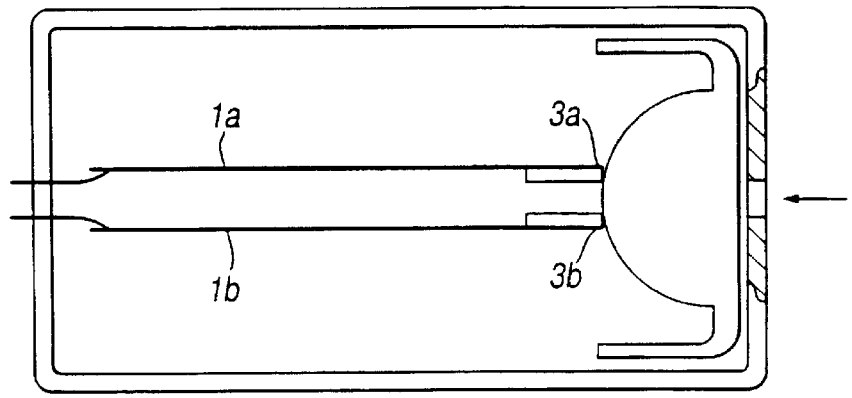
FIG. 2 shows the valve of FIG. 1 but in the "on" condition.

FIG. 1 shows the actuators in their rest condition and FIG. 2 shows them in the fully excited condition wherein they are effectively touching at the centre of the circle. In this state the pressure exerted by the air-flow and any return spring is effectively opposed by a column in compression providing a stiff system. Preferably but not exclusively the cylindrical cam be made substantially cylindrical with a flat portion at the centre to completely eliminate any sideways thrusts when the system is fully excited.

Figure 3:
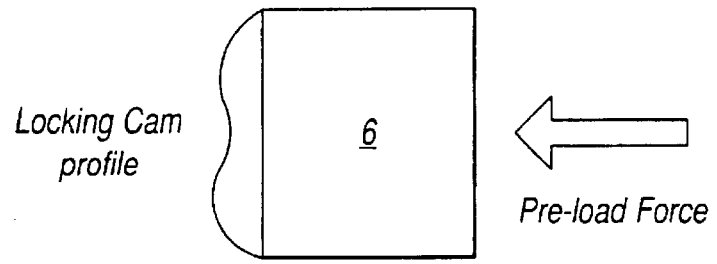
FIG. 3 shows diagrammatically a modification to the valve shown in FIGS. 1 and 2.

Similarly the inherent resilience of the system can be exploited and this portion can be made a dip to provide a locking action which will require the piezo actuator to be pulsed outwards to release as shown in FIG. 3.

Figure 4:
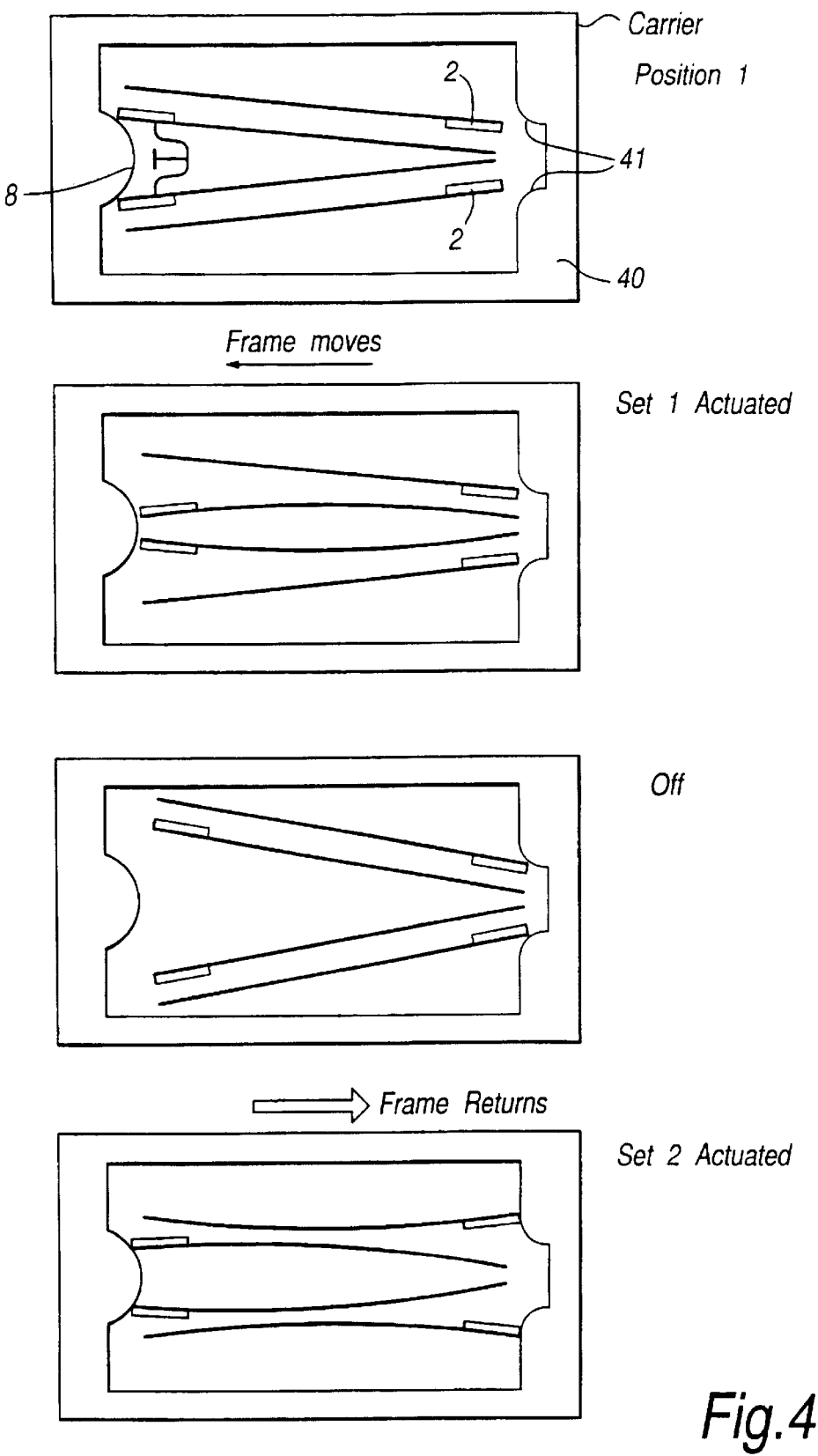
FIG. 4 shows diagrams to explain the construction and operation to a further embodiment of the valve shown in FIGS. 1 and 2.

The valve thus far described is a single acting valve having less force in its open condition than in its closed condition. Where it is desirable to provide a two position valve a second configuration of actuators performing the same function can be disposed as shown in FIG. 4. Actuation of the first set of actuators 1 on camming surface 8 displaces a carrier 40 and brings similar camming surfaces 41 into contact with a second set of actuators 2 which can then be actuated to force the carrier 40 back to its original position. It will be seen that the carrier 40 replaces the member 6 of FIGS. 1, 2 and 3.

There are several kinds of valve which are known to provide efficient switching. The valve thus far described is typically termed a poppet valve. The same construction may conveniently form a sliding valve wherein the motion of the frame aligns slits, holes or similar features to permit air-flow or to divert it from one channel to another.

It will be seen from the above description and accompanying illustrations that the fundamental principle can be applied in a number of different ways and that the mechanism itself need not apply merely to the control of air, but may be used for the switching of powders, liquids and mechanical systems.

It is particularly advantageous to use a cam of this type in preference to a toggle mechanism because the motion and forces available from piezo and electrostrictive actuators tend to be small but of high force. The losses that build up within a pivoted toggle system do not permit long life and repeatable actuation without high levels of engineering precision, such as the use of conical jewel-type bearings.

The use of living hinge and flexing member constructions is not preferred, because such systems tend to have a short life, are stiff and change over temperature.

To achieve the life cycles required of typical pneumatic valves which is $1 \times 10^9$ operations the tribology and management of the mating surfaces is critical. The surfaces can be made of any suitable material and it is known that PTFE loaded plastics operating on ceramic or similar materials are effective, as are ceramic to ceramic systems.

Further foreseeable improvements include the alteration of the camming profile to provide multiple points at which the system may be stopped to permit full flow, restricted flow and complete shut off.

What is claimed is:

1. A fluid valve comprising a valve member (6) arranged to be movable in a first direction to control fluid flow through an orifice (5) and electrically actuable means (1a, 1b) for controlling movement of said valve member (6), characterised in that the electrically actuable means (1a, 1b) comprises at least one bender element (1a) disposed in said first direction but bendable in a direction transverse to said first direction, and the valve member is provided with a profiled surface (8) engaging one end (3a) of the bender whereby the position of the valve member is controlled.

2. A fluid valve according to claim 1, wherein the electronically actuable means comprises two benders (1a, 1b) arranged to bend in opposite directions, and the profiled surface comprises oppositely directed curves.

3. A fluid valve according to claim 1, wherein the valve member (6) is located in a channel (7) and constrained to reciprocate in only said first direction within the channel (7).

4. A fluid valve according to claim 2, wherein the valve member comprises frame (40), one internal surface of which is provided with the profiled surface.

5. A fluid valve according to claim 4, wherein the frame two opposite surfaces provided with profiles of different shapes (8,41) and the electrically controllable means comprises two bender arrangements (1,2) arranged antiparallel to each other, the frame being moveable between first and second positions, in the first of which one of the profiles abuts one of the bender arrangements and in the other of which the other profile abuts the other bender arrangement.

6. A fluid valve according to claim 1 wherein the profile is shaped to provide an over-centre action requiring the bender to be actuated to move between first and second positions and back again.

7. A fluid valve according to claim 1, wherein the valve member comprises frame (40), one internal surface of which is provided with the profiled surface.

* * * * *